US012490943B2

(12) United States Patent
Vija et al.

(10) Patent No.: US 12,490,943 B2
(45) Date of Patent: Dec. 9, 2025

(54) SPECT SYSTEM WITH EXTENDED AXIAL FOV

(71) Applicant: Siemens Medical Solutions USA, Inc., Malvern, PA (US)

(72) Inventors: Alexander Hans Vija, Evanston, IL (US); Andrew Scheffel, Grayslake, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 204 days.

(21) Appl. No.: 18/450,548

(22) Filed: Aug. 16, 2023

(65) Prior Publication Data

US 2024/0230930 A1 Jul. 11, 2024

Related U.S. Application Data

(60) Provisional application No. 63/478,512, filed on Jan. 5, 2023.

(51) Int. Cl.
*A61B 6/03* (2006.01)
*A61B 6/42* (2024.01)
*G01T 1/29* (2006.01)
*G21K 1/02* (2006.01)

(52) U.S. Cl.
CPC ............ *A61B 6/037* (2013.01); *G01T 1/2985* (2013.01); *A61B 6/4266* (2013.01); *G21K 1/025* (2013.01)

(58) Field of Classification Search
CPC .................... A61B 6/037; G01T 1/2985
See application file for complete search history.

(56) References Cited

U.S. PATENT DOCUMENTS

| 4,651,007 | A | * | 3/1987 | Perusek | A61B 6/037 378/189 |
| 5,760,402 | A | * | 6/1998 | Hug | A61B 6/037 250/363.08 |
| 7,180,074 | B1 | * | 2/2007 | Crosetto | G01T 1/1615 250/370.09 |
| 10,213,173 | B2 | | 2/2019 | Wieczorek et al. | |
| 2004/0104350 | A1 | * | 6/2004 | Tsuchiya | G01T 1/2928 250/370.08 |
| 2012/0085911 | A1 | * | 4/2012 | McCroskey | G01T 1/1647 250/362 |
| 2014/0231655 | A1 | * | 8/2014 | Dueppenbecker | G01T 1/20 250/366 |
| 2019/0000406 | A1 | | 1/2019 | Liu et al. | |

FOREIGN PATENT DOCUMENTS

| EP | 3961570 A1 | 3/2022 |
| WO | 2022056508 A1 | 3/2022 |

* cited by examiner

*Primary Examiner* — Chih-Cheng Kao

(57) ABSTRACT

A system includes a housing having a first end portion and a second end portion, a SPECT detector disposed in the housing, a first support, a first coupling coupled to the first end portion of the housing and to the first support, a second support defining a bore, and a second coupling coupled to the second end portion of the housing and to the second support, where the housing is disposed between the first support and the second support.

20 Claims, 7 Drawing Sheets

SPECT SYSTEM WITH EXTENDED AXIAL FOV

CROSS-REFERENCE TO RELATED APPLICATIONS

This application claims priority to U.S. Provisional Patent Application No. 63/478,512, filed Jan. 5, 2023, the contents of which are incorporated by reference herein for all purposes.

BACKGROUND

In single-photon-emission-computed-tomography (SPECT) imaging, a radioactive substance is administered to a subject, and resulting γ-radiation emitted from the subject is detected by a SPECT detector. The γ-radiation is detected at various locations of the detector and the detector generates a data set representing the detected γ-radiation and its two-dimensional distribution. This data set may be considered a planar projection image.

Tomographic reconstruction technology enables generation of three-dimensional images of a subject from a set of planar projection images of the subject. The planar projection images are acquired from several angular positions around the subject by placing the subject adjacent to a gantry to which one or more detectors are attached and rotating the gantry so as to move the detectors to each desired angular position. A tomographic reconstruction unit reconstructs a three-dimensional image based on the projection images.

A conventional SPECT detector (e.g., using a NaI scintillator and a multi-channel collimator) provides a 40 cm axial field of view (FOV). However, dosimetry, therapy planning and monitoring often require images having a much longer axial FOV (e.g., 75 cm, 125 cm). Currently, such images are obtained by acquiring projection images at various projection angles in one axial FOV range and then acquiring projection images at various projection angles in an adjacent axial FOV range. A three-dimensional image is reconstructed from the projection images of each axial FOV range and the three-dimensional images are stitched together to generate a three-dimensional image exhibiting a long axial FOV. The above-described acquisition can exceed 30 minutes in a typical clinical setting. In a case that three axial FOV ranges are needed, acquisition times may increase by an additional 50%.

Theoretically, a large axial FOV image may be acquired quickly using a detector having a large axial FOV. However, such a detector poses cost and engineering issues. Larger detectors require larger scintillators, which require substantial retooling and design work. Larger detectors also require increased shielding against stray γ-radiation. Moreover, the increased detector weight caused by increased detector size may overwhelm current gantry systems and result in detector deflection (sagging) that would compromise image accuracy.

SPECT imaging systems which efficiently provide acquisition of quality long axial FOV images in a suitable timeframe are desired.

DETAILED DESCRIPTION

Figure 1A:
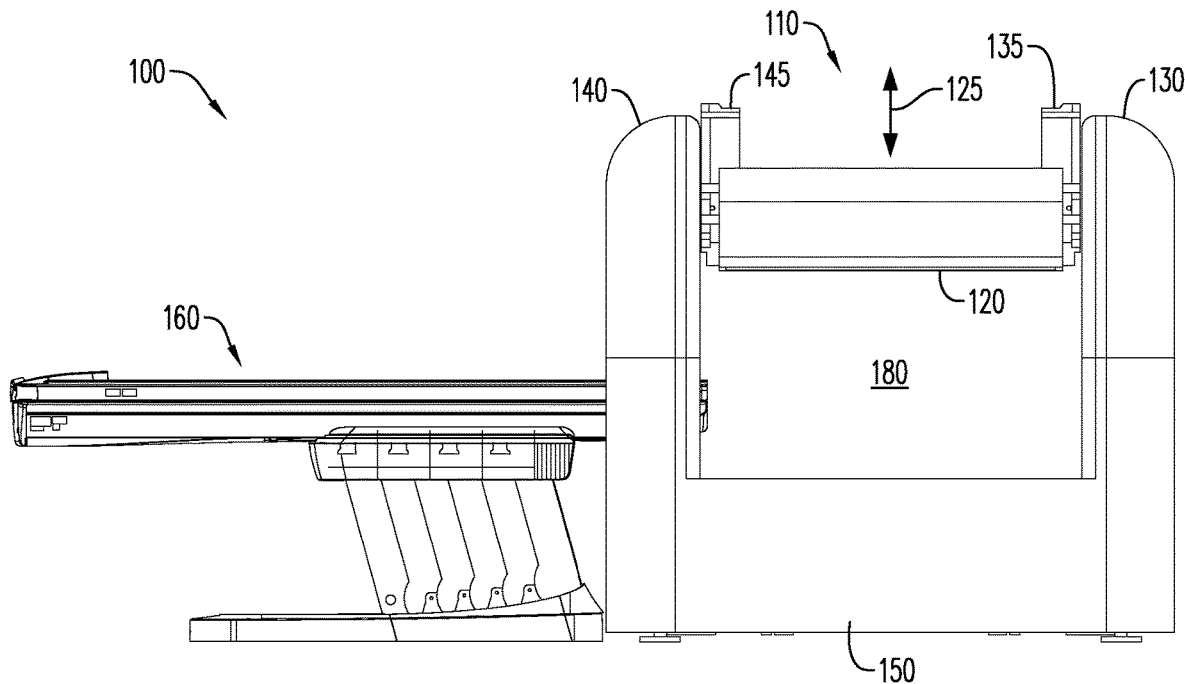
FIG. 1A is a side view of a single-headed imaging system according to some embodiments.

The following description is provided to enable any person in the art to make and use the described embodiments and sets forth the various modes contemplated for carrying out the described embodiments. Various modifications, however, will remain apparent to those in the art. Independent of the grammatical term usage, individuals with male, female or other gender identities are included within the term.

Some embodiments facilitate prompt acquisition of long axial FOV images using an axial-extended SPECT detector. Such a SPECT detector may be supported at a first axial end by a first support and at a second axial end by a second support. The second support may define a bore in which a subject resides during imaging. Providing a support at either axial end of the SPECT detector allows the use of a heavy SPECT detector without introducing substantial sagging or other geometrical anomalies. Shielding may contribute to the weight of the SPECT detector, the need for which is dependent on detector characteristics such as energy resolution and ability to determine the depth of interaction (DOI) for each detection event. Typically, shielding is needed for an NaI scintillator-based detector, but may not be needed for a CZT-based detector. Some embodiments further provide a non-enclosed volume between the two supports in which the subject resides, thereby facilitating access to the subject prior to and during imaging.

The SPECT detector may be coupled to each support in a manner which allows the SPECT detector to be rotated around the bore and to thereby acquire planar projection images of the subject from a plurality of projection angles. Embodiments may include a second SPECT detector also supported at a first axial end by the first support and at a second axial end by the second support. Use of a second (or third, or fourth) SPECT detector allows for simultaneous acquisition of projection images from multiple projection angles.

According to some embodiments, the SPECT detector includes two or more substantially-independent SPECT detectors. Each substantially-independent SPECT detector includes a respective portion of converter material (direct or indirect) and a respective anode array (e.g., a matrix of photomultiplier tubes (PMTs). In one particular example, three SPECT detectors which each have a 40 cm axial dimension and a 50 cm transaxial dimension may be combined into a SPECT detector having a 120 cm axial dimension and a 50 cm transaxial dimension according to some embodiments. By providing such an axial field of view, embodiments may acquire desired images (e.g., theranostic images) of a large proportion of male and female populations in a single acquisition (i.e., without requiring motion of the patient relative to the detector and "stitching" of successively-generated three-dimensional images). Embodiments are not limited to a 120 cm axial dimension and are contemplated to span an axial dimension of up to 2 m and beyond.

In some embodiments, two or more substantially-independent SPECT detectors are coupled to different types of collimators. In the case of two substantially-independent SPECT detectors, the collimators may comprise a parallel hole collimator and a slant hole collimator, a slanthole collimator and a pinhole collimator, or any other combination of two different types of collimators.

Figure 1B:
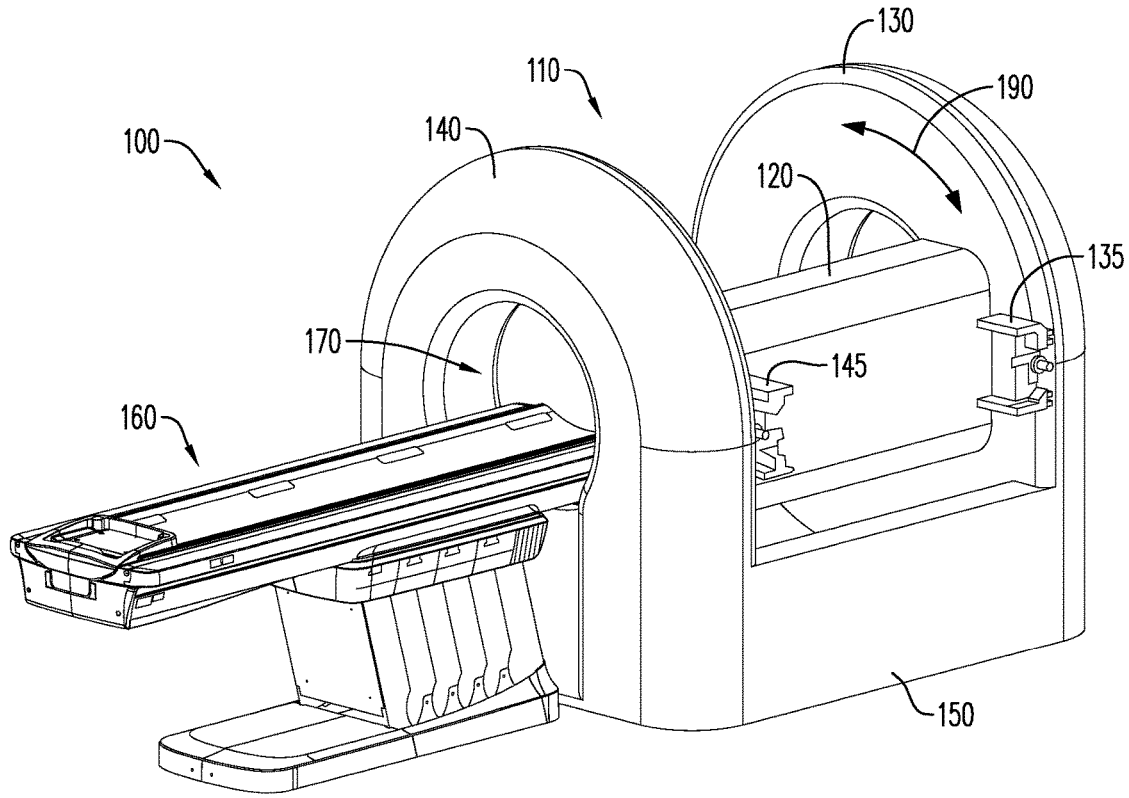
FIG. 1B is a perspective view of a single-headed imaging system according to some embodiments.

FIGS. 1A and 1B are views of SPECT imaging system 100 according to some embodiments. Each component of system 100 and each other component described herein may be implemented using any combination of hardware and/or software. Some components may share hardware and/or software of one or more other components. Each component may also be constructed using any combination of suitable materials.

System 100 includes SPECT imaging system 110 and table 160. Imaging system 110 includes detector housing 120 coupled to first support 130 via coupling 135 and to second support 140 via coupling 145. First support 130 and second support 140 are substantially vertical and, in the illustrated embodiment, rigidly coupled to one another via lower housing 150. Second support 140 defines bore 170 through which a subject may pass in order to enter imaging volume 180. Advantageously, an operator may access the subject via bore 180 before and during imaging without disturbing the position of the subject.

Detector housing 120 includes a SPECT detector and one or more collimators as will be described below. Couplings 135 and 145 are coupled to opposite axial ends of detector housing 120 and include drive elements to move housing 120 (and, as a result, the SPECT detector disposed therein) in the directions indicated by arrows 125 (i.e., toward and away from a central axial axis of volume 180). Couplings 135 and 145 are also coupled to elements of respective supports 130 and 145 which move couplings 135 and 145 in the directions of arrows 190 so as to rotate housing 120 around volume 180. As is known in the art, this movement allows acquisition of planar projection images of a subject disposed in volume 180 from different projection angles.

Table 160 supports an imaging subject and may be movable to place the subject in a desired position with respect to a detector within housing 120. The desired position may be a position intended to best capture emission data emitted by a radioisotope located within a specific portion of the subject. Table 160 may include any features and mechanisms needed to facilitate selective positioning of an imaging subject disposed on table 160 with respect to a detector within housing 120.

Figure 2A:
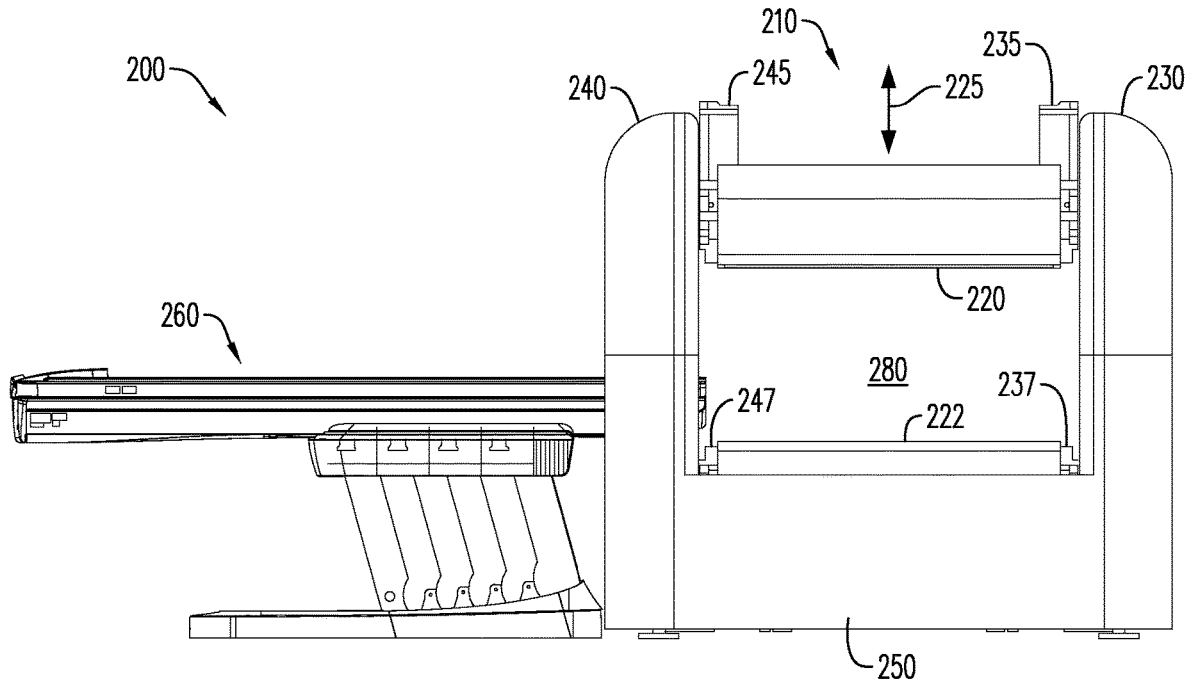
FIG. 2A is a side view of a dual-headed imaging system according to some embodiments.
Figure 2B:
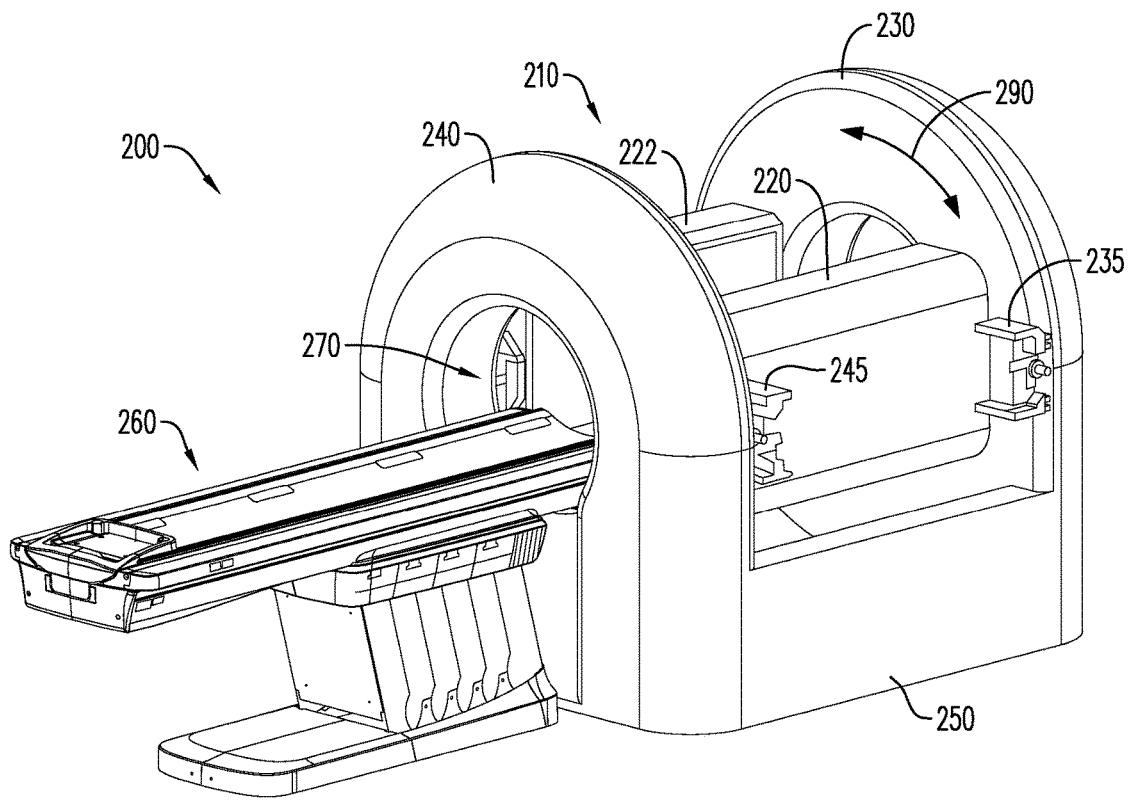
FIG. 2B is a perspective view of a dual-headed imaging system according to some embodiments.

FIGS. 2A and 2B illustrate a dual-headed imaging system according to some embodiments. The components of system 200 may be implemented as described above with respect to similarly-numbered components of system 200 but embodiments are not limited thereto.

In addition to detector housing 220, imaging system 210 includes detector housing 222 which includes a SPECT detector and is also coupled to first support 230 and to second support 240. Detector housing 222 is positioned substantially opposite from housing 220 across bore 280.

Couplings 237 and 247 are coupled to opposite axial ends of detector housing 222 and include drive elements to move housing 222 and its SPECT detector toward and away from a central axial axis of volume 280. Couplings 237 and 247 are also coupled to elements of respective supports 130 and 140 to move couplings 237 and 247 in the directions of arrows 290 so as to simultaneously rotate housings 220 and 222 around volume 280. This movement allows simultaneous acquisition of planar projection images of a subject disposed in volume 280 from two opposite and selectable projection angles.

Figure 3:
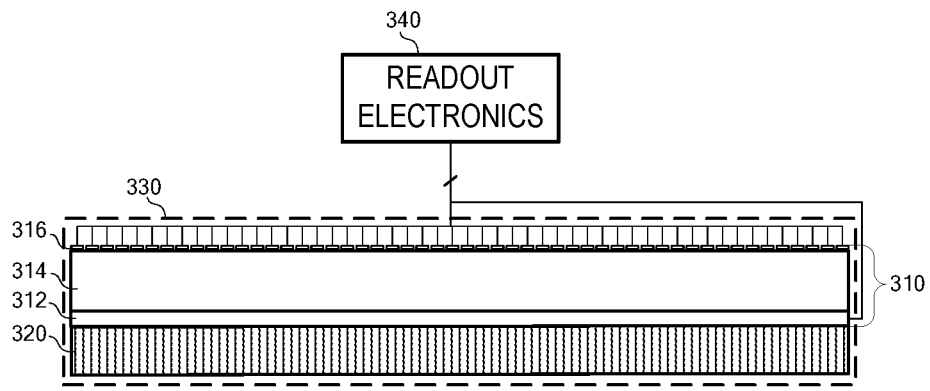
FIG. 3 is a side cutaway view of a detector according to some embodiments.

FIG. 3 is schematic depiction of components of SPECT detector 310 according to some embodiments. For purposes of the present description, a "detector" will refer to a system including one or more cathodes, portions of converter material and sets of sensors. In the case of an indirect converter material such as a scintillator, the sensors are PMTs. A direct converter-based detector, on the other hand, uses an array of conductive anodes as its sensors. Detector 310 is a direct converter-based detector but embodiments are not limited thereto.

Cathode 312 of detector 310 may comprise a continuous layer which is generally transparent to gamma rays having energies that are to be detected by detector 310. Converter 314 may comprise a single-crystal semiconductor material which converts gamma rays into photons, such as CZT or Cadmium Telluride (CdTe). Converter 314 may be manufactured by cutting a forged NaI (for example) boule lengthwise.

Sensors 316 may comprise a grid of hexagonal or otherwise-shaped conductive anodes. Each sensor of sensors 316 is coupled to a dedicated signal line and is not in direct electrical contact with its adjacent neighboring sensors.

Collimator 320 is coupled to detector 310. Collimator 320 is depicted as a parallel-hole collimator but may comprise a multi-focal cone-beam collimator or any other collimator type that is or becomes known. Generally, collimator 320 defines the line-of-response of incoming gamma rays and filters out scattered or stray gamma radiation. Detector 310 and collimator 320 may be disposed in housing 330, which is in turn coupled to a first and second support as described above.

In one example of operation, detector 310 is positioned to detect gamma rays emitted from a volume. Certain ones of the gamma rays are collimated by collimator 320, and the collimated gamma rays pass through cathode 312 due to its transparency thereto. A gamma ray which passes through cathode 312 and penetrates into direct converter material 314 interacts with direct conversion material 314 to generate electron-hole pairs. Cathode 312 is held at a negative bias potential while sensors 316 are held at a less-repelling potential. Consequently, the positively-charged holes drift towards cathode 312, while the negatively-charged electrons drift towards sensors 316. As the electrons approach a given sensor 316, a signal is induced at the given sensor and at its neighboring sensors.

After collection of the electrons by the given sensor, readout electronics 340 may use the signals received from the neighboring sensors to determine a sub-pixel position of the given sensor at which the gamma ray will be assumed to have been received. The sub-pixel positions at which all gamma rays are received over a given time period may then be used to generate a projection image. A three-dimensional image of the subject may be reconstructed from a plurality of such projection images acquired at different projection angles as is known in the art.

In the case of an indirect converter-based detector, the collimated gamma rays pass directly to the indirect converter (e.g., a NaI scintillator) and interact therewith to generate photons. The photons may pass through a light guide before being received by a matrix of PMTs. The PMTs generate electrical signals based on the received photons, which are used by readout electronics as described above.

Figure 4:
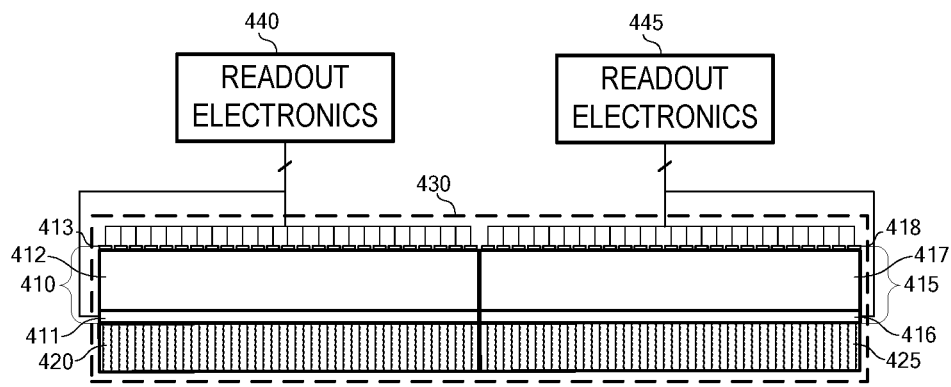
FIG. 4 is a side cutaway view of a detector according to some embodiments.

FIG. 4 illustrates a detector comprised of two separate detectors according to some embodiments. Detectors 410 and 415 are respectively coupled to collimators 420 and 425, and all of these components are disposed in housing 430. Axial ends of housing 430 may be coupled to first and second supports as described above.

Detectors 410 and 415 may be identical but embodiments are not limited thereto. Detector 410 includes cathode 411, converter 412 comprising a portion of converter material, and sensors 413. Similarly, detector 415 includes cathode 416, converter 417 comprising a portion of converter material, and sensors 418. Collimators 420 and 425 are depicted as parallel-hole collimators but embodiments are not limited thereto. Any mechanical "gaps" between detectors 410 and 415 may be addressed using software- and/or collimation-based solutions.

Readout electronics 440 receives signals from sensors 413 of detector 410 and readout electronics 445 receives signals from sensors 418 of detector 415. Detectors 410 and 415 may operate substantially independently to acquire respective axially-adjacent planar projection images. In one particular example, detectors 410 and 415 have an axial dimension of between 30-50 cm, and the detector of FIG. 4 therefore exhibits an axial dimension of 60-100 cm. Each of sensors 413 and 418 my comprise an independent assembly of 59 PMTs in some embodiments.

Figure 5:
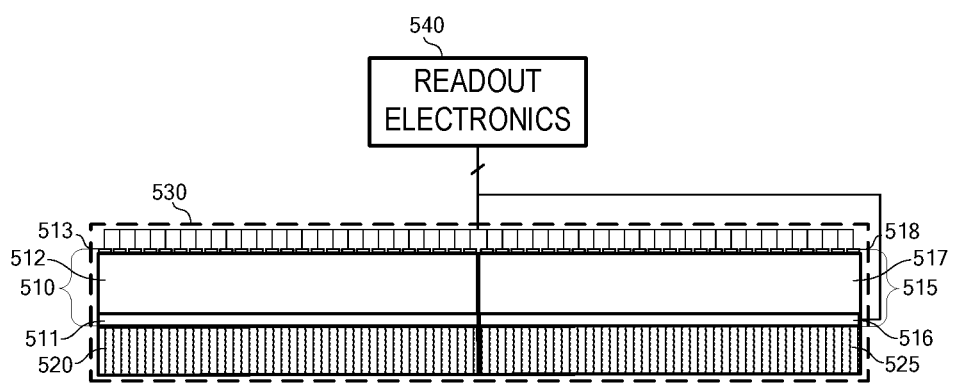
FIG. 5 is a side cutaway view of a detector according to some embodiments.

FIG. 5 illustrates a detector comprised of two separate detectors according to some embodiments. Disposed in housing 530 are detectors 510 and 515 respectively coupled to collimators 520 and 525. Again, axial ends of housing 530 may be coupled to first and second supports.

The FIG. 5 detector may be identical to the FIG. 4 detector, except that readout electronics 540 receives signals from sensors 513 and from sensors 518. Readout electronics 540 may therefore generate a planar projection having longer axial FOV than either of detectors 510 and 515 alone. Cathode 511 may be electrically coupled to cathode 516 in order to normalize signals received from sensors 513 and from sensors 518 to one another. In some embodiments, cathodes 511, 516 and converters 512, 517 are portions of respective detectors and sensors 513, 518 are a single contiguous matrix of sensors placed thereon.

Figure 6:
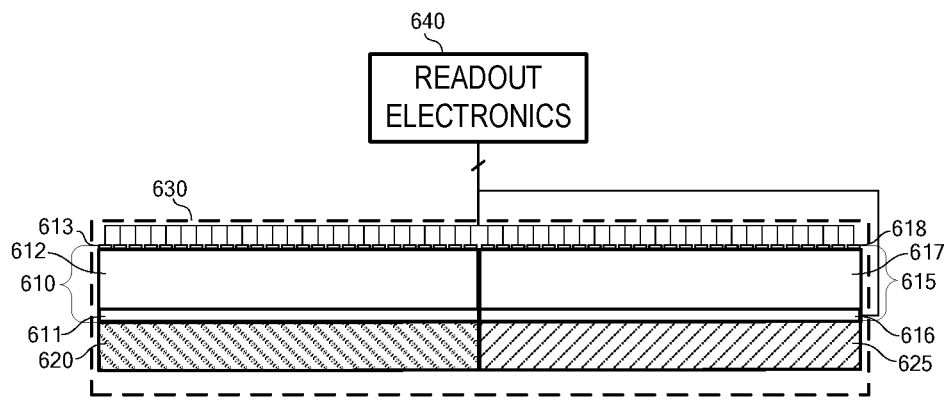
FIG. 6 is a side cutaway view of a detector including two different collimators according to some embodiments.
Figure 7:
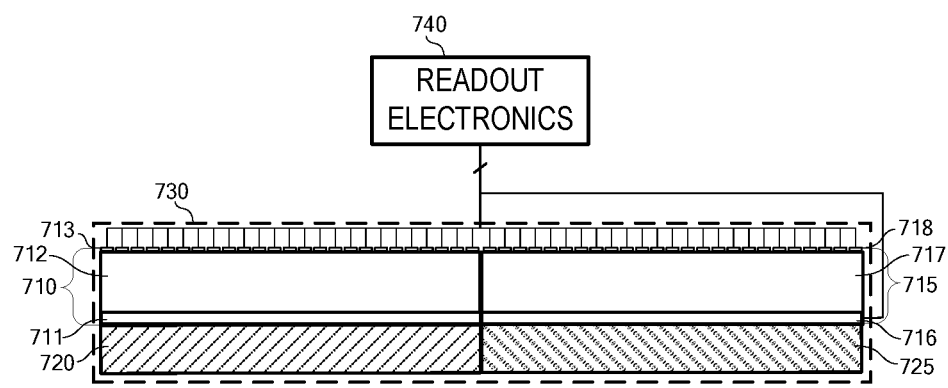
FIG. 7 is a side cutaway view of a detector including two different collimators according to some embodiments.
Figure 8:
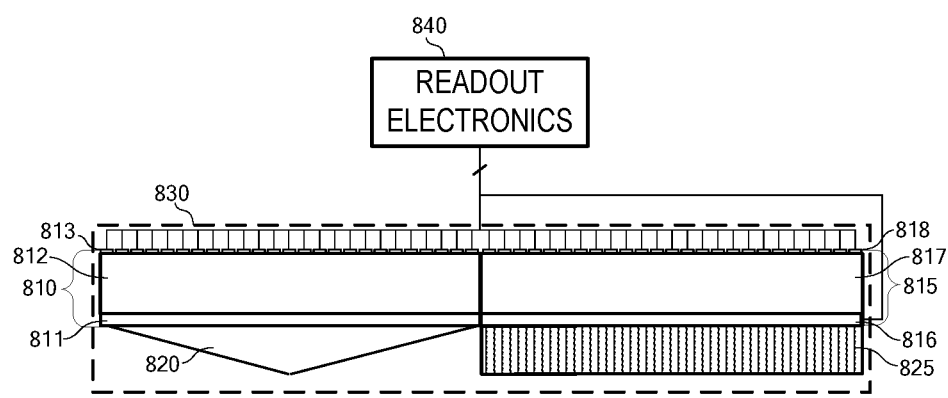
FIG. 8 is a side cutaway view of a detector including two different collimators according to some embodiments.

Each of FIGS. 6-8 illustrates the use of two different collimator types in conjunction with the detector of FIG. 5. Any detector according to some embodiments may be coupled to any combination of two or more types of collimators. The use of different collimator types provides flexibility in the acquisition of an image over a large axial FOV.

FIG. 6 shows collimator 620 and collimator 625 coupled to detector 610 and detector 615, respectively. Collimator 620 and collimator 625 are slanthole collimators having holes oriented in opposite directions. Collimator 620 and collimator 625 may function in tandem as a single converging collimator for the FIG. 6 detector.

Similarly, FIG. 7 shows slanthole collimators 720 and 725 coupled to detector 710 and detector 715, respectively. The holes of collimators 720 and 725 are oriented in opposite directions. However, in contrast to FIG. 6, the respective orientations of the holes provide divergent collimation to the FIG. 7 detector.

The detector of FIG. 8 is coupled to pinhole collimator 820 and parallel-hole collimator FIG. 6. Accordingly, anodes 813 of detector 810 collect electrical signals corresponding to pinhole-collimated gamma radiation and anodes 818 of detector 815 collect electrical signals corresponding to parallel hole-collimated gamma radiation. A projection image based on these electrical systems will therefore exhibit pinhole collimation characteristics over the axial FOV of detector 810, and parallel hole collimation characteristics over the axial FOV of detector 815.

Figure 9:
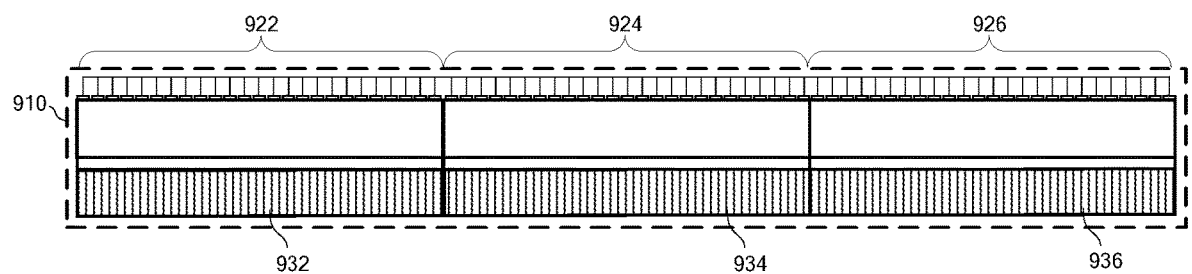
FIG. 9 is a side cutaway view of a detector including two different collimators according to some embodiments.

FIG. 9 is a schematic view of a detector according to some embodiments. The FIG. 9 detector is comprised of three detectors 922, 924 and 926. For example, each of detectors 922, 924 and 926 may have a 40 cm axial dimension and a 50 cm transaxial dimension, causing the FIG. 9 detector to effectively have a 120 cm axial dimension and a 50 cm transaxial dimension.

Detectors 922, 924 and 926 are respectively coupled to collimators 932, 934 and 936. As described above, collimators 932, 934 and 936 may comprise any combination of any suitable collimator types. Housing 910 houses detectors 922, 924 and 926 and collimators 932, 934 and 936. Axial ends of housing 910 may be coupled to first and second supports to provide the FIG. 9 detector with support as well as translational and rotational movement as described above.

Figure 10A:
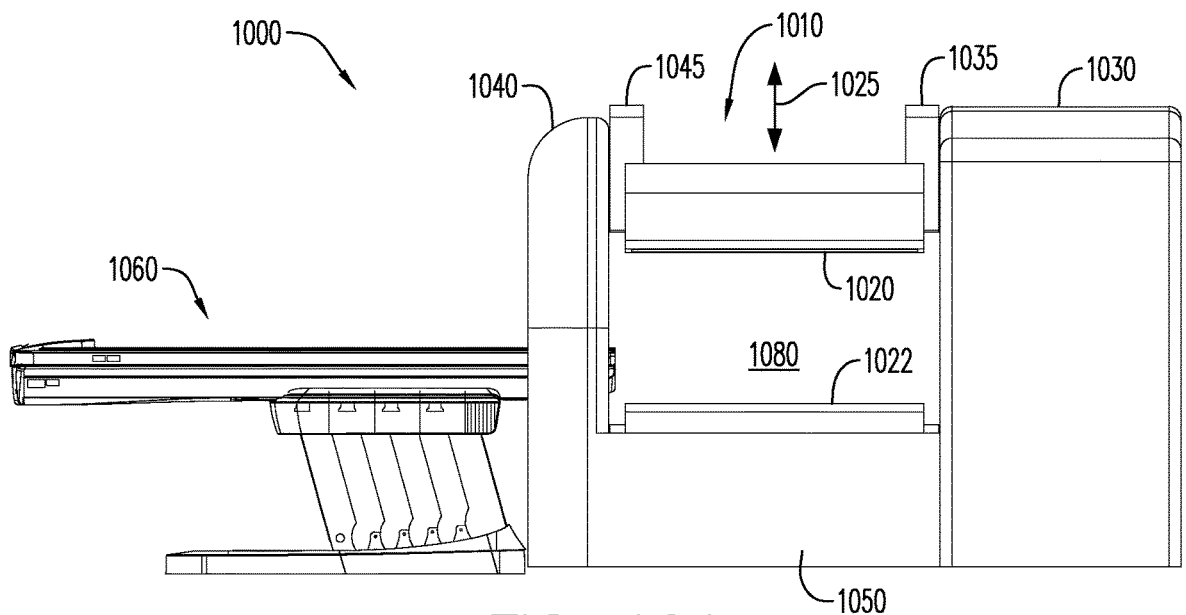
FIG. 10A is a perspective view of a dual-headed imaging system according to some embodiments.
Figure 10B:
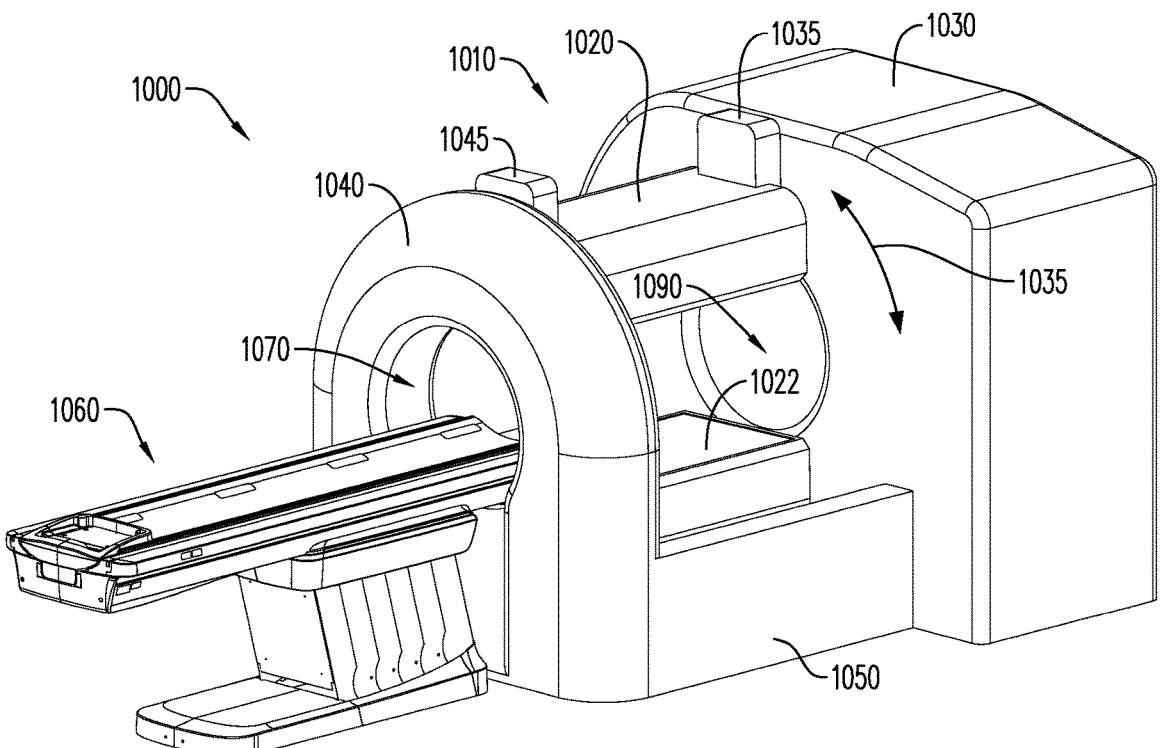
FIG. 10B is a side view of a dual-headed imaging system according to some embodiments.

FIGS. 10A and 10B illustrate a dual-headed SPECT/CT system 1000 according to some embodiments. System 1000 may be implemented as described above with respect to system 200, except for the substitution of CT housing 1030 for first support 230 of system 200. As is known in the art, CT housing 1030 includes CT imaging elements (i.e., one or more X-ray tubes and one or more X-ray detectors) and defines bore 1090 into which a subject is placed to be imaged using the CT imaging elements.

More particularly, table 1060 may operate to move a subject into bore 1090 to acquire a CT image using the CT imaging elements, and then to move the subject into volume 1080 to acquire planar SPECT images using detectors 1020 and 1022. The latter acquisitions may include movement of detectors 1020 and 1022 as illustrated by arrows 1025 and/or 1035.

The CT image may be used to segment structures within the subject and to determine an attenuation map of the subject. The segmentation and the attenuation map may then be used during reconstruction of a three-dimensional image based on the acquired planar SPECT images. Since the position of the subject on table 1060 might not change substantially between the CT and SPECT acquisitions, registration of the segmentation and the attenuation map to the SPECT images is simplified.

Figure 11:
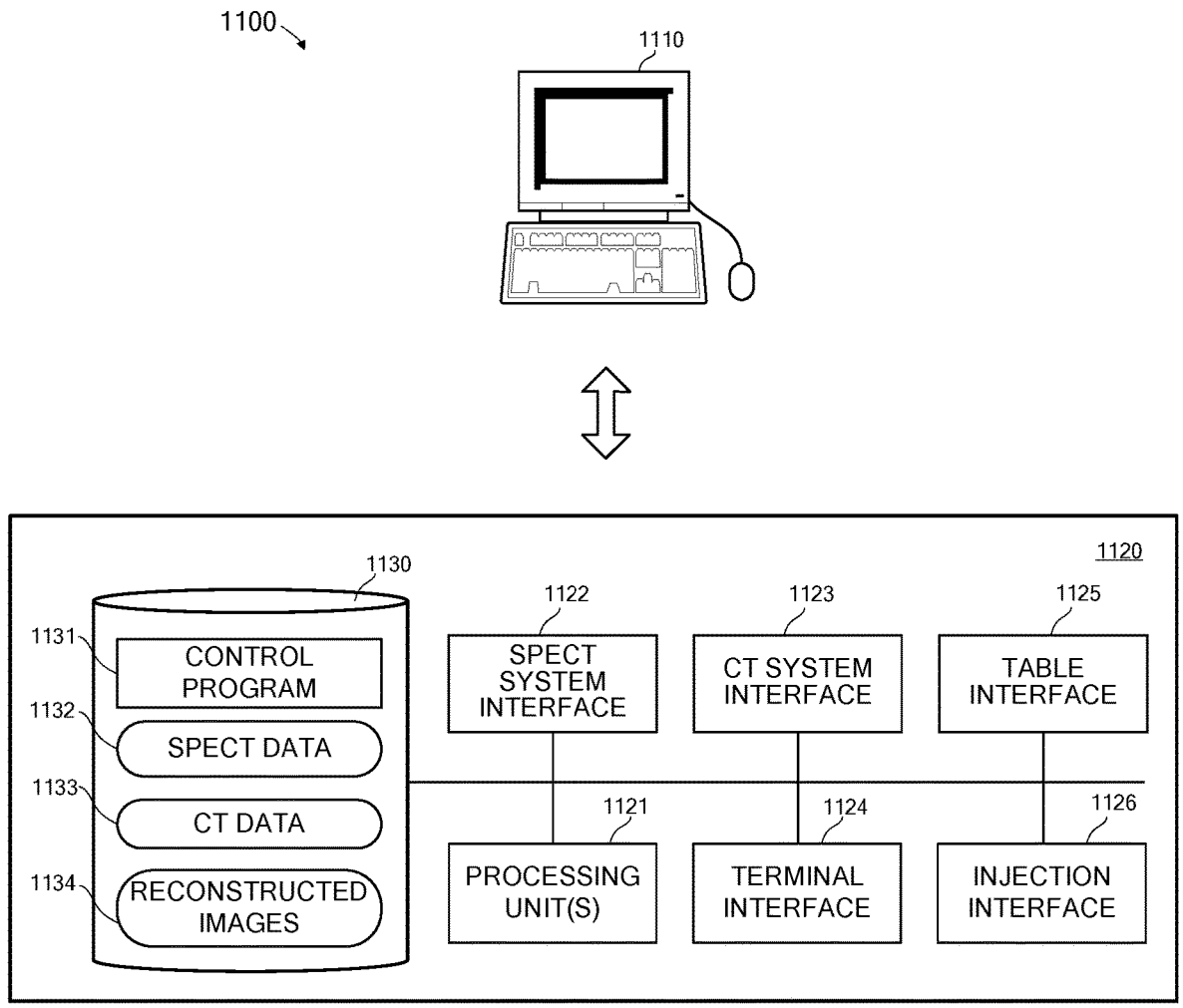
FIG. 11 illustrates components of a SPECT/CT imaging system according to some embodiments.

FIG. 11 is a block diagram of components 1100 of a SPECT/CT imaging system according to some embodiments. Terminal 1110 may comprise a display device and an input device coupled to control system 1120. An operator may operate terminal 1110 to instruct control system 1120 through terminal interface 1124 to cause a SPECT/CT imaging system to acquire desired images of a subject. Terminal 1110 may receive and display the acquired images as well as images reconstructed by control system 1120. In some embodiments, terminal 1110 is a computing device separate from control system 1120 such as, but not limited to, a desktop computer, a laptop computer, a tablet computer, and a smartphone.

Control system 1120 may comprise any general-purpose or dedicated computing system. Control system 1120 includes one or more processing units 1121 configured to execute executable program code to cause system 1120 to operate as described herein, and storage device 1130 for storing the program code. Storage device 1130 may comprise one or more fixed disks, solid-state random access memory, and/or removable media (e.g., a thumb drive) mounted in a corresponding interface (e.g., a USB port).

Storage device 1130 stores program code of control program 1131. One or more processing units 1121 may execute control program 1131 to, in conjunction with SPECT system interface 1122, control motors, servos, and encoders to cause SPECT detectors to rotate around a subject and acquire two-dimensional projection images (i.e., SPECT data 1132) at defined projection angles during the rotation. The acquisition may be preceded by controlling a table using table interface 1125 to position the subject and controlling an injector to inject a radionuclide into the subject using injection interface 1126. Similarly, control program 1131 may be executed to control CT imaging elements using CT system interface 1123 to acquire CT data 1133. Control program 1131 may further be executed to reconstruct images 1134 based on SPECT data 1132 and CT data 1133.

Those in the art will appreciate that various adaptations and modifications of the above-described embodiments can be configured without departing from the claims. Therefore, it is to be understood that the claims may be practiced other than as specifically described herein.

What is claimed is:

1. A system comprising:
   a housing having a first end portion and a second end portion;
   a SPECT detector disposed in the housing;
   a first collimator of a first collimator type disposed in the housing and operably coupled to a first portion of the SPECT detector;
   a second collimator of a second collimator type different from the first collimator type disposed in the housing and operably coupled to a second portion of the SPECT detector;
   a first support;
   a first coupling coupled to the first end portion of the housing and to the first support;
   a second support defining a bore; and
   a second coupling coupled to the second end portion of the housing and to the second support, where the housing is disposed between the first support and the second support.

2. A system according to claim 1, further comprising:
   first drive elements to move the first coupling and the second coupling to result in movement of the SPECT detector around the bore, the first coupling and the second coupling comprising second drive elements to move the SPECT detector toward and away from a center of the bore.

3. A system according to claim 1, wherein an axial field of view of the SPECT detector is between 80 cm and 120 cm, inclusive.

4. A system according to claim 1, the SPECT detector comprising:
   a first SPECT detector comprising a first portion of converter material; and
   a second SPECT detector comprising a second portion of converter material separate from the first portion of converter material.

5. A system according to claim 4:
   the first SPECT detector comprising a first cathode and a first sensor array; and
   the second SPECT detector comprising a second cathode and a second sensor array.

6. A system according to claim 4, wherein the first collimator is operably coupled to the first SPECT detector; and
   wherein the second collimator is operably coupled to the second SPECT detector.

7. A system according to claim 1, the SPECT detector comprising:
   only one contiguous portion of converter material;
   a first sensor array coupled to the one contiguous portion of converter material; and
   a second sensor array coupled to the one contiguous portion of converter material.

8. A method comprising:
   mounting a SPECT detector into a housing having a first end portion and a second end portion, the SPECT detector or comprising a first collimator of a first collimator type disposed in the housing and operably coupled to a first portion of the SPECT detector and a second collimator of a second collimator type different from the first collimator type disposed in the housing and operably coupled to a second portion of the SPECT detector;
   coupling a first coupling to the first end portion of the housing and to a first substantially vertical support; and
   coupling a second coupling to the second end portion of the housing and to a second substantially vertical support defining a bore such that the housing is disposed between the first support and the second support.

9. A method according to claim 8, further comprising:
   moving the first coupling and the second coupling to result in movement of the SPECT detector around the bore; and
   operating the first coupling and the second coupling to move the SPECT detector toward and away from a center of the bore.

10. A method according to claim 8, wherein an axial field of view of the SPECT detector is between 80 cm and 120 cm, inclusive.

11. A method according to claim 10, wherein mounting the SPECT detector into the housing comprises:
    mounting a first SPECT detector comprising a first portion of converter material into the housing; and
    mounting a second SPECT detector comprising a second portion of converter material separate from the first portion of direct converter material into the housing.

12. A method according to claim 11, wherein the first SPECT detector comprises a first cathode and a first sensor array, and the second SPECT detector comprising a second cathode and a second sensor array.

13. A method according to claim 11, further comprising:
    coupling the first collimator to the first SPECT detector; and
    coupling the second collimator to the second SPECT detector.

14. A method according to claim 8, the SPECT detector comprising:
    only one contiguous portion of converter material;
    a first sensor array coupled to the one contiguous portion of converter material; and
    a second sensor array coupled to the one contiguous portion of converter material.

15. A system comprising:

a SPECT detector having an axial dimension and a transaxial dimension, the SPECT detector comprising a first collimator of a first collimator type operably coupled to a first portion of the SPECT detector and a second collimator of a second collimator type different from the first collimator type operably coupled to a second portion of the SPECT detector;

a first substantially vertical support coupled to a first axial end of the SPECT detector; and a second substantially vertical support defining a bore and coupled to a second axial end of the SPECT detector.

16. A system according to claim 15, wherein an axial field of view of the SPECT detector is between 80 cm and 120 cm, inclusive.

17. A system according to claim 15, the SPECT detector comprising:
   a first SPECT detector comprising a first portion of converter material; and
   a second SPECT detector comprising a second portion of converter material separate from the first portion of direct converter material.

18. A system according to claim 17:
   the first SPECT detector comprising a first cathode and a first sensor array; and
   the second SPECT detector comprising a second cathode and a second sensor array.

19. A system according to claim 17, wherein the first collimator is operably coupled to the first SPECT detector; and wherein the second collimator is operably coupled to the second SPECT detector.

20. A system according to claim 15, the SPECT detector comprising:
   only one contiguous portion of converter material;
   a first sensor array coupled to the one contiguous portion of converter material; and
   a second sensor array coupled to the one contiguous portion of converter material.

* * * * *